United States Patent Office 2,990,270
Patented June 27, 1961

2,990,270
METHOD FOR PREPARING METAL CRYSTALS
Robert A. Lefever, Bon Air, Va., assignor to Texaco Inc., a corporation of Delaware
No Drawing. Filed June 2, 1958, Ser. No. 738,984
1 Claim. (Cl. 75—33)

The present invention relates to a novel method for preparing metal crystals by reduction in a fused salt medium, and more particularly is concerned with preparing small discrete single crystals of such metals which may be used in studies involving catalysis, surface, adsorption, and surface activities; or may be valuable for infrared, magnetic and thermo-magnetic studies.

In accordance with the principles of this invention, there is provided a novel method for preparing crystals of a desired metal comprising the steps of first preparing in a crucible a molten mixture of a first halide of the desired metal and one or more halides of at least one other metal selected from the group consisting of the alkali and alkaline earth metals. There is then added into the molten halide mixture a reducing agent characterized by its ability to reduce the desired metal halide without reducing the other metal halide. Ordinarily the reducing agent is hydrogen, lithium aluminum hydride or a reducing metal which is above the desired metal in the electromotive series. Among the reducing metals which have been used successfully are aluminum, magnesium, and zinc. The halide of the desired metal is thus reduced to small discrete single crystals of metal in the melt.

The melt is then cooled slowly to room temperature and solidifies as a cake. Separation of the desired metal crystals from the cake is accomplished by dissolving in water the water soluble portion of the cake so that the desired metal crystals and water insoluble residues accumulate on the bottom of a vessel. The residual salt solution is then decanted off. When the desired metal is one such as iron, nickel, or cobalt which is magnetic, the insoluble residues are further separated from the metal crystals by washing them off with water while positioning a magnet on the outside of the vessel so as to retain the metal crystals.

Ordinarily, the decanted salt solution still is rich in the halide of the desired metal so that it may be evaporated to dryness, and the resulting recovered dried salts may be reused for the production of metal crystals by remelting them and proceeding with the reduction in the manner described above for the primary crystallization operation.

The alkali or alkaline earth metal halide melt may comprise a halide of an individual metal such as lithium, sodium, potassium, or magnesium, or it may comprise a mixture of two or more of these halides. Ordinarily, the chlorides are preferred, but satisfactory results also have been obtained with the bromides and iodides.

While the described method has wide application to the production of various types of metal crystals, especially good results have been obtained with the metals of the iron family comprising iron, nickel and cobalt; all having generally similar properties among which is their magnetic nature.

All of the reducing agents mentioned above have been used successfully, but some difficulty attaches to the use of hydrogen and magnesium since both of these substances are so light that they will not sink in the melt to give as uniform and complete a reduction as may be desired. For example, magnesium tends to float on the melt so that concentration gradients are set up, resulting in the formation of long dendrites rather than the more desirable spherical polyhedra. Aluminum and zinc, on the other hand, sink in the melt and are more uniformly distributed.

As far as temperature is concerned, the primary criterion is that it be sufficiently high for the mixture of halides to be in a molten condition. Ordinarily, when metallic aluminum, magnesium and zinc are to be used as the reducing agent the molten halide pool should be at a temperature above the melting point of the particular metal in order to assure that the oxide coating on the metal surface will be disrupted. If the melt is below the melting point of a reducing metal, it would not be dispersed uniformly therein and dendrites would be produced rather than discrete spherical polyhedra. Ordinarily, a satisfactory range of temperature for the melt is from 500° to 1200° C. Temperature is not a critical parameter for the production of any particular crystal habit, but it does influence the size of the crystals obtained. At the lower end of the temperature range smaller crystal sizes generally result for any given reaction time, although long dendrites may sometimes occur. At the higher end of the temperature range more and larger crystal particles are obtained for any given reaction time.

While not absolutely necessary, it is desirable to exclude oxygen from contact with the melt at least during the initial period before the reducing agent is added. This ordinarily is accomplished by maintaining an atmosphere of argon, nitrogen or any other inert non-reactive gas above the melt. Once the reducing agent has been introduced the melt itself is under reducing conditions so that the presence of oxygen is not harmful. Of course, when hydrogen is the reducing agent oxygen should be excluded completely because it forms an explosive mixture.

When hydrogen is used as the reducing agent the melt is brought up to a desired reaction temperature under a blanketing atmosphere of a non-reactive gas such as argon, and then the hydrogen is added to the argon blanket for reaction with the melt. However, operations can be conducted successfully by using a pure hydrogen blanket which acts not only as the reducing agent but as the protector against oxidation.

The effect of time is primarily upon the size of the crystals obtained. The longer the melt is held at temperature with the reducing agent therein, the larger are the crystals obtained.

At the present time I have not discovered how to control the habit of the metal crystals so as to obtain a desired crystal form irrespective of the source of melt constituents. Habit is very sensitive to the source of the halide of the iron family metal. A given halide batch may produce metal crystals that have cubic, octahedral or other shapes, but its behavior is consistent. It is my hypothesis that crystal habit is affected primarily by the type and amount of impurities present in the halide, but there is at present insufficient information available to explain the relationship between habit and impurities. However, by proper adjustment of experimental conditions, nickel powders containing particles of the following types can be prepared:

(1) Polyhedra exposing (100) faces only. These particles are cubic and/or rectangular platelets.

(2) Polyhedra exposing (111) faces only. These particles are triangular platelets, hexagonal platelets and octahedra.

(3) Elongated rods believed to expose (100) faces.

(4) Dendritic particles.

Among the factors that have been identified as having a pronounced influence on nickel polyhedron shape, size, and surface quality are:

(1) Such experimental parameters as reduction temperature, nature of the reducing agent, concentration of the metal halide in the fused salt mixture, and nature of the alkali halide solvent.

(2) Source of supply of the metal halide.

(3) "Purity" of the melt, as indicated by the effect of certain "additives."

It is believed that habit-influencing impurities are removed by the metal crystals during the crystallization procedures, since experiments have shown that upon repeated reuse of the residual salts there often occurs a change in the crystal habit of the recovered metal from the habit exhibited in previous crystallizations. This change sometimes occurs in the second crystallization, and other times not until several additional crystallizations have been completed.

The concentration of the halides of the desired metal in the fused salt has not been found to exhibit a pronounced effect on crystallization. There may be variation in shape of the individual crystal particles, but not in the crystallographic orientation of the surfaces. For example, in a melt comprising a mixture of potassium chloride and nickel chloride the recovered nickel crystals generally have the shape of elongated rods when the proportion of nickel chloride is below 10% and when it is above 75% by weight. Between 10 and 75% by weight of nickel chloride, the crystals are more compact in shape, being such polyhedra as cubes.

Upon the addition of reducing agent to a melt, the crystals of reduced metal form immediately. Holding the melt at the reaction temperature allows these crystals to grow in size but not significantly in number.

A number of specific examples of how the principles of the present invention have been successfully applied to the growth of various metal single crystals are described below. In each of the examples, after the reaction mixture had been cooled to room temperature distilled water was added to dissolve the soluble halides, the metal crystals were held at the bottom of the container with an externally positioned magnet and the solution and non-magnetic solids were poured off and filtered. Repeated washings with distilled water removed foreign material from the crystals while they were held magnetically at the bottom of the container.

*Example 1*

10 grams reagent grade nickel chloride ($NiCl_2.6H_2O$) and 10 grams reagent grade potassium chloride (KCl) were mixed, placed in a crucible and heated to 800° C. under a continuous flow of argon. A gas mixture comprising 0.05 cubic feet per hour hydrogen and 5.0 cubic feet per hour argon was then passed over the molten halides for one hour. The reaction mixture was then cooled to room temperature under an argon atmosphere.

The nickel product consisted of cubic particles, the majority of which were ½ micron to 5 microns on an edge.

*Example 2*

One gram reagent grade nickel chloride and 10 grams reagent grade potassium chloride were mixed, placed in a crucible and heated to 800° C. under a continuous flow of argon. A gas mixture comprising 0.03 cubic foot per hour hydrogen and 5.0 cubic feet per hour argon was passed over the molten halides for two hours. The reaction mixture was then cooled to room temperature under an argon atmosphere.

The nickel product consisted primarily of rods about 10–20 microns long and 0.25–1 square micron in cross-section.

*Example 3*

10 grams reagent grade nickel chloride and 10 grams reagent grade potassium bromide (KBr) were mixed, placed in a crucible and heated to 800° C. under a continuous flow of argon. A gas mixture comprising 0.05 cubic foot per hour hydrogen and 5.0 cubic feet per hour argon was passed over the molten halides for one hour. The reaction mixture was then cooled to room temperature under an argon atmosphere.

The nickel product consisted of cubic particles, the majority of which were 0.1 micron to 5 microns on an edge.

*Example 4*

10 grams reagent grade nickel chloride and 10 grams reagent grade potassium iodide (KI) were mixed, placed in a crucible and heated to 800° C. under a continuous flow of argon. A gas mixture comprising 0.05 cubic foot per hour hydrogen and 5.0 cubic feet per hour argon was passed over the molten halides for one hour. The reaction mixture was then cooled to room temperature under an argon atmosphere.

The nickel product consisted of cubic particles, the majority of which were about 0.1 micron to 5 microns on an edge.

*Example 5*

10 grams reagent grade nickel chloride and 10 grams reagent grade sodium chloride (NaCl) were mixed, placed in a crucible and heated to 1000° C. under a continuous flow of argon. Four pellets of aluminum, each weighing about 30 milligrams, were added to the melt at a rate of one pellet every 15 minutes. The melt was held at 1000° C. for one hour after addition of the last pellet, and then allowed to cool to room temperature under argon.

The nickel product consisted of cubic particles, the majority of which were one to 5 microns on an edge.

*Example 6*

10 grams reagent grade nickel chloride and 21 grams reagent grade magnesium chloride ($MgCl_2.6H_2O$) were mixed, placed in a crucible and heated to 1000° C. under a continuous flow of argon. Four pellets of aluminum, each weighing about 30 milligrams, were added to the melt at a rate of one pellet every 15 minutes. The melt was held at 1000° C. for one hour after addition of the last pellet, and then allowed to cool to room temperature under argon.

The nickel product consisted of cubic particles ranging in size from about 0.1 to 5 microns in edge length and agglomerated material.

*Example 7*

10 grams reagent grade nickel chloride, 5 grams reagent grade potassium chloride, and 5 grams reagent grade lithium chloride (LiCl) were mixed, placed in a crucible and heated to 1000° C. under a continuous flow of argon. A total of 0.255 gram of aluminum in pellet form was gradually added to the melt, after which the melt was held at 1000° C. for an additional ½ hour. The melt was then allowed to cool to room temperature under argon.

The nickel product consisted primarily of cubic and rectangular particles with edge lengths of about one to five microns. Octahedral particles of about the same size were also present.

*Example 8*

10 grams reagent grade nickel chloride, 5 grams reagent grade potassium chloride, and 5 grams reagent grade lithium chloride were mixed, placed in a crucible tube and heated to 1000° C. under a continuous flow of argon. A total of one gram of zinc filings was gradually added to the melt, after which the melt was held at 1000° C. for one additional hour. The melt was then allowed to cool to room temperature under an argon atmosphere.

The nickel product comprised square and rectangular platelets about one to 5 microns in edge length, more complex polyhedra of about the same size, and larger particles composed of individual polyhedra that had grown together.

Example 9

10 grams reagent grade nickel chloride, 5 grams reagent grade potassium chloride, and 5 grams reagent grade lithium chloride were mixed, placed in a crucible and heated to 1000° C. under a continuous flow of argon. About ¾ gram magnesium turnings was gradually added to the melt, after which the melt was held for one additional hour at 1000° C. The melt was then allowed to cool to room temperature under an argon atmosphere.

The nickel product contained branched dendritic particles with branches about 100 microns in length. Many of the dendrite branches gave the appearance of well-developed cubes stacked corner-to-corner.

Example 10

10 grams reagent grade nickel chloride and 10 grams reagent grade potassium chloride were mixed, placed in a crucible and heated to 1000° C. under a continuous flow of argon. A total of 0.1 gram lithium aluminum hydride ($LiAlH_4$) in powder form was gradually added to the melt, after which the melt was held at 1000° C. for two hours. The melt was then allowed to cool to room temperature under argon.

The nickel product contained cubic particles about 0.1 to one micron in edge length and right-triangular platelets 1 to 5 microns in edge length and about 0.1 to 0.5 micron thick.

Example 11

10 grams reagent grade nickel chloride and 10 grams reagent grade potassium chloride were mixed, placed in a crucible and heated to 1230° C. under a continuous flow of argon. One-half gram of aluminum, in pellet form, was added and the melt was allowed to cool to room temperature under argon after holding at 1230° C. for an additional five minutes.

The nickel product contained cubes, octahedra and particles of more complex geometry with the majority of the material about 0.5 micron in edge length. Rods and stacked cubes several microns in length were also present.

Example 12

10 grams reagent grade nickel chloride, 5 grams reagent grade potassium chloride, and 5 grams reagent grade lithium chloride were mixed, placed in a crucible and heated to 550° C. One 50 milligram particle of aluminum was cut in half in the argon atmosphere just above the melt and dropped into the reaction mixture. This was repeated once every hour for 5 hours after which the melt was held at 550° C. for one additional hour. The melt was then allowed to cool to room temperature under argon.

The nickel product contained branched dendrites with branches ten to 20 microns in length and agglomerated particles of irregular shape and size.

Example 13

10 grams reagent grade nickel chloride and 10 grams reagent grade potassium chloride were mixed, placed in a crucible and heated to 1000° C. under a continuous flow of argon. 0.1 gram aluminum in pellet form was added to the melt every ten minutes until a total of two grams was added. The melt was held at 1000° C. for six hours after the last aluminum addition and then allowed to cool to room temperature under argon.

The nickel product consisted of a single, porous mass of interlocking, branched dendrites. The branches of the dendrites were about 10 to 100 microns in length and about 0.5 to 1 micron across the diameter.

Example 14

10 grams reagent grade nickel chloride and 10 grams reagent grade potassium chloride were dissolved in 250 cc. distilled water and filtered. 30 cc. concentrated hydrochloric acid was added to the filtrate, after which it was boiled to dryness. The dry chloride mixture was transferred to a crucible and heated to 1000° C. under a continuous flow of argon. One 30 milligram pellet of aluminum was added to the melt every ten minutes until 5 pellets were added. The melt was held at 1000° C. for ten minutes after addition of the last pellet of aluminum and then cooled to room temperature under argon.

The nickel product consisted of well-developed cubes with edge lengths of one to 5 microns for the majority of the particles. The surfaces of these cubes were shown by chemical etching to be parallel to the (100) crystal planes of nickel.

The filtrate containing the potassium chloride, unreacted nickel chloride and a small amount of insoluble matter was boiled to dryness after addition of 2 cc. concentrated hydrochloric acid. The resulting dry chloride mixture was transferred to a crucible and heated to 1000° C. under a continuous flow of argon. One 30 milligram pellet of aluminum was added every 10 minutes until 5 pellets were added. The melt was held at 1000° C. for 10 minutes after addition of the last pellet of aluminum and then cooled to room temperature under argon.

The second nickel product consisted of equilateral triangular platelets and hexagonal platelets with edge lengths of about two to 8 microns. No cubic particles were observed. The surfaces of these particles were shown by chemical etching to be parallel to the (111) crystal planes of nickel.

Example 15

10 grams reagent grade nickel chloride and 10 grams reagent grade potassium chloride were mixed, transferred to a crucible and heated to 1000° C. under a continuous flow of argon. One pellet of aluminum, weighing about 20 milligrams, was added to the melt every 15 minutes until 4 pellets were added. The melt was held at 1000° C. for 1 hour after the last aluminum addition and then allowed to cool to room temperature under argon.

The nickel product weighed 70 milligrams (representing a reaction efficiency of about 25% based on the amount of aluminum added) and consisted almost entirely of nickel cubes, the majority of which were one to 5 microns in edge length.

Example 16

A reaction similar to Example 15 was conducted. In addition to the nickel and potassium chlorides, however, 0.05 gram reagent grade potassium cyanide (KCN) was added to simulate an impurity prior to adding the mixed solids to the crucible tube.

The nickel product consisted almost entirely of equilateral triangular platelets, hexagonal platelets and octahedra with edge lengths of about 1 to 5 microns. No cubic particles were observed.

This example demonstrates that impurities have a pronounced effect on crystal habit.

Example 17

10 grams reagent grade cobalt chloride ($CoCl_2 \cdot 6H_2O$) and 10 grams reagent grade potassium chloride were mixed, placed in a crucible and heated to 1000° C. under a continuous flow of argon. Two pellets of aluminum, weighing about 30 milligrams each, were added to the melt every 10 minutes until 10 pellets were used. The melt was held at 1000° C. for one hour after addition of the last aluminum pellet and then allowed to cool to room temperature under argon.

The cobalt product consisted of cubic particles, the majority of which had edge lengths of about 0.5 to 5 microns. Most of the particles had rounded corners and irregular surface patterns. Verification of the composition as metallic cobalt was made by X-ray powder patterns.

Example 18

10 grams reagent grade ferrous chloride ($FeCl_2 \cdot 4H_2O$) and 10 grams reagent grade potassium chloride were mixed, placed in a crucible and heated to 1000° C. under a continuous flow of argon. Two small pellets of lithium aluminum hydride, weighing about 20 milligrams each, were added to the melt. The melt was held at 1000° C. for six hours and then allowed to cool to room temperature under argon.

The iron consisted of a very finely divided powder containing uniform cubes with edge lengths of about 0.1–1.0 micron. Branched dendrites with branches up to 3–4 millimeters in length were also present. The powder was shown to consist of $\alpha$-iron by X-ray powder studies.

Obviously, many modifications and variations of the invention, as hereinbefore set forth, may be made without departing from the spirit and scope thereof, and therefore only such limitations should be imposed as are indicated in the appended claim.

I claim:

A method for preparing crystals of a magnetic metal selected from the group consisting of iron, nickel and cobalt comprising the steps of first preparing in a crucible a molten mixture of a first halide of said metal and at least one second halide selected from the group consisting of the alkali and alkaline earth metal halides; then precipitating said crystals of metal by adding into said molten mixture reducing agent for said first halide selected from the group consisting of hydrogen, lithium aluminum hydride, magnesium, aluminum and zinc, thereby forming a mixture of said crystals of metal and a non-magnetic residue; cooling and solidifying said molten mixture; and then separating said crystals of metal from said non-magnetic residue by dissolving at least part of said residue in water, magnetically attracting said crystals of metal to the internal wall of said crucible, and removing the dissolved and undissolved non-magnetic residue therefrom.

References Cited in the file of this patent

UNITED STATES PATENTS

| | | |
|---|---|---|
| 1,748,748 | Ashcroft | Feb. 25, 1930 |
| 2,396,792 | Kroll | Mar. 19, 1946 |
| 2,656,267 | De Marchi | Oct. 20, 1953 |
| 2,828,199 | Findlay | Mar. 25, 1958 |
| 2,846,304 | Keller et al. | Aug. 5, 1958 |
| 2,848,319 | Keller et al. | Aug. 19, 1958 |

FOREIGN PATENTS

| | | |
|---|---|---|
| 762,541 | Great Britain | Nov. 28, 1956 |